No. 874,787. PATENTED DEC. 24, 1907.
J. G. MURPHY.
AUXILIARY POWER DEVICE.
APPLICATION FILED MAY 17, 1907.
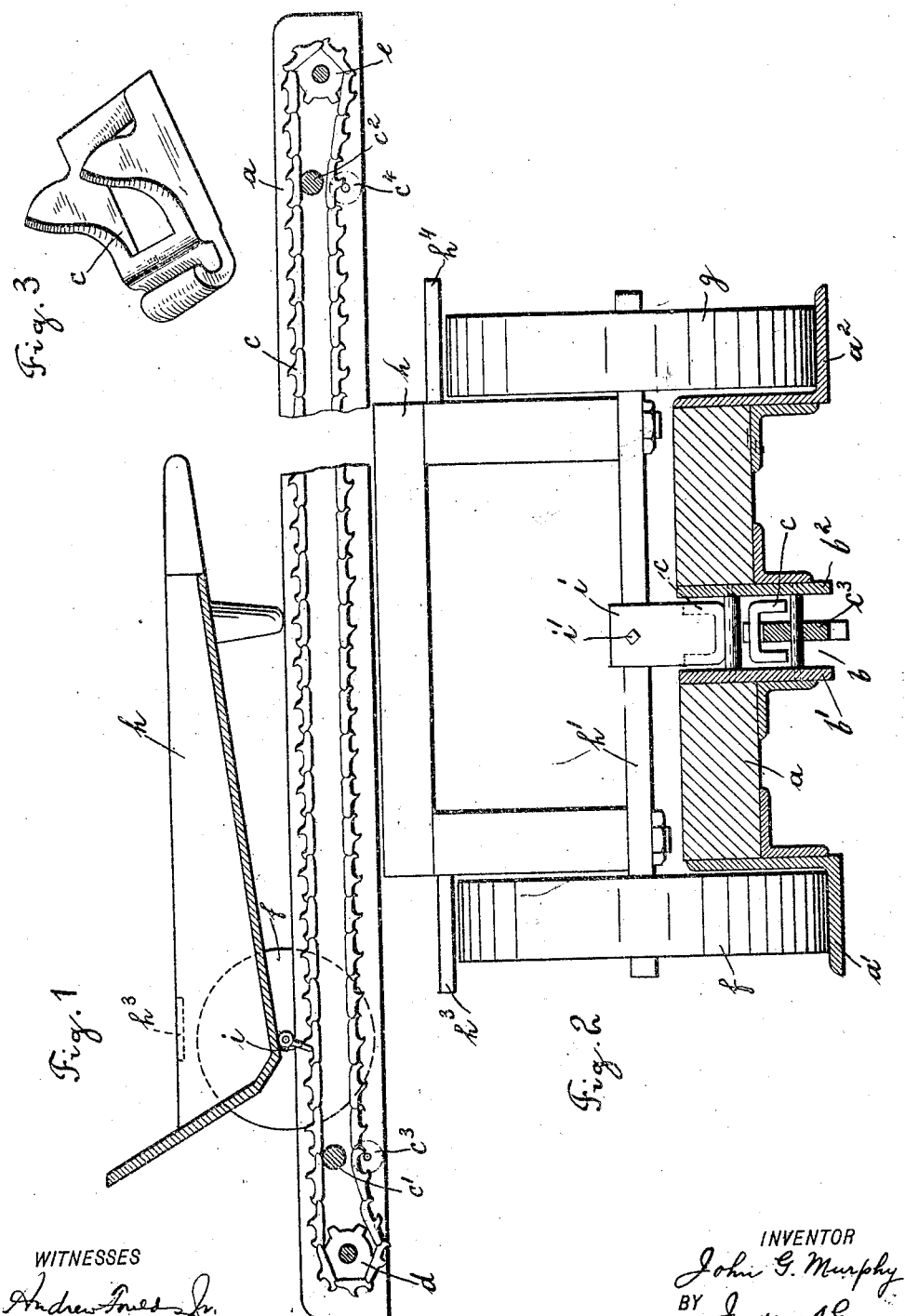

UNITED STATES PATENT OFFICE.

JOHN G. MURPHY, OF NEW YORK, N. Y.

AUXILIARY POWER DEVICE.

No. 874,787.

Specification of Letters Patent.

Patented Dec. 24, 1907.

Application filed May 17, 1907. Serial No. 374,147.

*To all whom it may concern:*

Be it known that I, JOHN G. MURPHY, a citizen of the United States, and residing at No. 402 West One Hundred and Twenty-fifth street, in the borough of Manhattan, New York city, State of New York, have invented a certain new and useful Improvement in Auxiliary Power Devices, of which the following is a specification.

My invention relates to improvements in auxiliary power devices, and the object of my invention is to provide a simple and effective means whereby a truck or similar structure may be hauled up an inclined surface such as a skid or platform.

In the accompanying drawings which illustrate my invention Figure 1 is a longitudinal sectional view of my device with a hand truck thereon. Fig. 2 is a rear view of a truck and a lateral cross section of the skid. Fig. 3 is a view of a link of the chain.

Similar letters refer to similar parts throughout the several views.

Through the longitudinal center of a skid or platform $a$, I provide a slot $b$, having therein an endless chain $c$ mounted upon sprocket rollers $d$ and $e$ at each end of the skid, either or both of the sprocket rollers $d$ and $e$ being revolved by power applied in a suitable manner. Supporting rollers $c^1$ $c^2$ $c^3$ $c^4$ journaled in the sheathing $b^1$ $b^2$ of the slot $b$ are provided at suitable intervals. On each of the longitudinal sides of the skid $a$ are provided angle pieces $a^1$ $a^2$ to form a track for the wheels $f$ and $g$ respectively, of the truck $h$. These tracks may however be formed in any desired manner. The truck $h$ is supported upon the axle $h^1$ of the wheels $f$ and $g$. A stud $i$ is secured to the under side of the truck $h$, preferably as I have shown, on the axle $h^1$ by means of a bolt $i^1$. This stud $i$ projects downwardly from the under side of the truck $h$, a sufficient distance to engage the chain $c$, when the wheels of the truck are in position on the track $a^1$ $a^2$. I provide guards $h^3$ and $h^4$ on the side of the truck $h$ over the wheels $f$ and $g$.

I have shown in my drawings the usual form of hand truck $h$ provided with two wheels, but my device is equally applicable to a truck of any form. The stud $i$ may be secured to the under side of the truck $h$ in such manner that it will turn backward when accidentally engaging an obstruction, but will not move forward beyond the perpendicular.

It will thus be seen that the truck $h$ may be operated in the usual manner in the transportation of loads independently of my device, which is intended as an auxiliary means for hauling the truck up an inclined surface. When the truck $h$ is brought to the lower end of the skid, or other inclined surface, the stud $i$ depending from the under side of the truck $h$, will engage one of the links of the endless chain $c$ actuated by power applied to one or both of the sprocket rollers $d$ and $e$, and will thus be drawn up the inclined surface. When the truck reaches the top of the ascent, the stud $i$ will be released from the chain $c$, and the truck is used as before in the transportation of its load.

I have shown in my drawings an endless chain but any equivalent may be used to advantage, such as a screw or cable.

Having thus described my invention, what I claim is

1. In a device of the character described, the combination of a platform longitudinally slotted, angle pieces secured to the side of the platform forming a track below the plane of the platform surface, an endless chain mounted upon sprocket rollers at each end of the platform, and lying below the upper surface, supporting rollers intermediate of the ends of the platform, and a truck having a stud secured to its under side and lying within the slot to engage the endless chain, when the wheels of the truck are on the tracks, substantially as shown and described.

2. In a device of the character described the combination of a platform longitudinally slotted, angle pieces, secured to the side of the platform, forming a track below the plane of the platform surface, and engaging medium within the slot movable from the lower end of the platform toward the upper end, and lying below the upper surface, a truck having a stud secured to its under side and lying within the slot to engage the movable medium when the wheels of the truck are on the tracks substantially as shown and described.

In testimony whereof, I have signed my name to this specification in the presence of two subscribing witnesses, this 26th day of April 1907.

JOHN G. MURPHY.

Witnesses:
ANDREW FRIEDS, Jr.,
MAE R. IVES.